United States Patent
Sasaki et al.

(10) Patent No.: US 6,293,362 B1
(45) Date of Patent: Sep. 25, 2001

(54) VEHICLE HOOD APPARATUS

(75) Inventors: Sakae Sasaki; Tatsuya Ishizaki; Kaoru Nagatomi, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/611,930

(22) Filed: Jul. 7, 2000

(30) Foreign Application Priority Data

Jul. 9, 1999 (JP) ................................................ 11-196780
Jul. 9, 1999 (JP) ................................................ 11-196781

(51) Int. Cl.$^7$ ............................................................ B60R 21/34
(52) U.S. Cl. .................................................................. 180/274
(58) Field of Search ............................. 180/274; 296/194; 280/748

(56) References Cited

U.S. PATENT DOCUMENTS

| | | | |
|---|---|---|---|
| 3,709,316 | * | 1/1973 | Glance . |
| 4,249,632 | | 2/1981 | Lucchini et al. . |
| 4,572,314 | | 2/1986 | Anguera . |
| 4,753,475 | * | 6/1988 | Mochida . |
| 6,182,782 | * | 2/2001 | Matsuura et al. ..................... 180/274 |
| 6,217,108 | * | 4/2001 | Sasaki .................................. 296/194 |

FOREIGN PATENT DOCUMENTS

| | | |
|---|---|---|
| 9-315266 | 5/1996 | (JP) . |
| 10-258774 | 3/1997 | (JP) . |
| 11-34925 | 7/1997 | (JP) . |
| 11-115680 | * 4/1999 | (JP) . |
| 12-264146 | * 9/2000 | (JP) . |

OTHER PUBLICATIONS

Specification of Application No.: 09/610,187.
Specification of Application No.: 09/611,249.
Specification of Application No.: 09/613,125.
Specification of Application No.: 09/619,323.

* cited by examiner

Primary Examiner—Paul N. Dickson
(74) Attorney, Agent, or Firm—Merchant & Gould P.C.

(57) ABSTRACT

A vehicle hood apparatus comprises a hood-lifting actuator for lifting a rear end of a hood when a vehicle collided with an obstacle, and a hood-returning actuator for returning the hood to its original position. The apparatus also includes a timer for timing a predetermined time elapsed after the hood is lifted by the hood-lifting actuator. When the predetermined time elapsed, the timer outputs a lapse signal. Based on this signal, the hood returning actuator is operated to return the hood to its original position. As a result, a diver's view obstructed by the lifted hood can be instantly cleared.

2 Claims, 18 Drawing Sheets

VEHICLE HOOD APPARATUS

BACKGROUND OF THE INVENTION

1. Field of the Invention

This invention relates generally to a hinged hood apparatus for covering a front engine room of a vehicle and, more particularly, to a vehicle hood apparatus arranged such that when a vehicle employing the hood apparatus collided with an obstacle while running, it mitigates the collision impact applied to the obstacle.

2. Description of the Prior Art

When an obstacle is hit by a running vehicle, the obstacle is often hit first by a front bumper of the vehicle, flown up and then landed on the hood. At this time, the obstacle is imparted with an impact of collision with the hood.

For mitigating such a collision impact, a vehicle hood apparatus is proposed in Japanese Patent Laid-Open Publication No. HEI-9-315266. The proposed hood apparatus is arranged such that upon collision, a rear end of the hood is lifted to provide a gap between the hood and an engine compartment or room so that the hood can deform downward to thereby absorb collision energy. In the hood apparatus, the collision of the vehicle with the obstacle is detected by a collision sensor. Based on a collision signal output from the collision sensor, a control unit actuates a rod of a hood lifting/retaining mechanism to ascend to cause a flexible link mechanism to extend or stretch to thereby lift a rear end of the hood so that a gap is provided between the hood and the engine room and the hood can be retained at its lifted position.

However, the obstacle hit by the vehicle does not always bump against an upper surface of the hood. In this instance, the lifted hood does nothing but to obstruct a driver's view. Since it is undesirable to obstruct a driver's view, the hood should soon be returned to its original position.

SUMMARY OF THE INVENTION

It is therefore an object of the present invention to provide a vehicle hood apparatus which can instantly free a driver from a state in which his view is obstructed by a hood lifted upon collision of an obstacle with a vehicle.

According to an aspect of the present invention, there is provided a vehicle hood apparatus for, when a vehicle collided with an obstacle, lifting a hood at a frontal part of the vehicle a predetermined amount and retaining the hood at a lifted position, the hood apparatus comprising a timer for timing a predetermined time elapsed from the lift of the hood; and a hood-returning actuator for, when the predetermined time elapsed, returning, based on a signal outputted from the timer, the hood to a position where the hood was before lifting thereof.

When the vehicle collided with the obstacle and the predetermined time elapsed after the hood is lifted, it is determined that the obstacle will no longer collide with the hood, thereby causing the hood-returning actuator to return the hood to its original position. As a result, a driver's view obstructed by the lifted hood can be instantly cleared.

According to a second aspect of the present invention, there is provided a vehicle hood apparatus for, when a vehicle collided with an obstacle, lifting a hood at a frontal part of the vehicle a predetermined amount and retaining the hood at a lifted position, the hood apparatus comprising: a hood collision detecting sensor for, when the obstacle collided with the hood, outputting a collision signal corresponding to the detected collision; a hood-returning actuator being operable to return the lifted hood to an original position thereof; and a hood-returning control section for, when fed with the collision signal after the hood is lifted and when fed with no collision signal but the time elapsed from the lift of the hood falls within the predetermined time, controlling the hood-returning actuator such that the actuator retains the hood at its lifted position, and for, when the predetermined time elapsed from the lift of the hood without being fed with the collision signal, controlling the hood-returning actuator such that the actuator returns the hood to its original position.

In the thus-arranged apparatus, the hood is lifted upon collision of the vehicle with the obstacle. When the hood collision detecting sensor detected the collision of the obstacle with the hood after the hood is lifted, the lifted hood is held in its lifted position so that the hood can substantially deform to thereby mitigate or absorb the collision impact applied to the obstacle.

When the predetermined time elapsed without the collision of the obstacle against the hood being detected by the hood collision detecting sensor, the hood is returned to a position where it was before it was lifted. As a result, a driver's view obstructed by the lifted hood can be instantly cleared.

BRIEF DESCRIPTION OF THE DRAWINGS

Certain preferred embodiments of the present invention will now be described in detail, by way of example only, with reference to the accompanying drawings, in which.

DETAILED DESCRIPTION OF THE PREFERRED EMBODIMENTS

The following description is merely exemplary in nature and is in no way intended to limit the invention, its application or uses.

Figure 1:
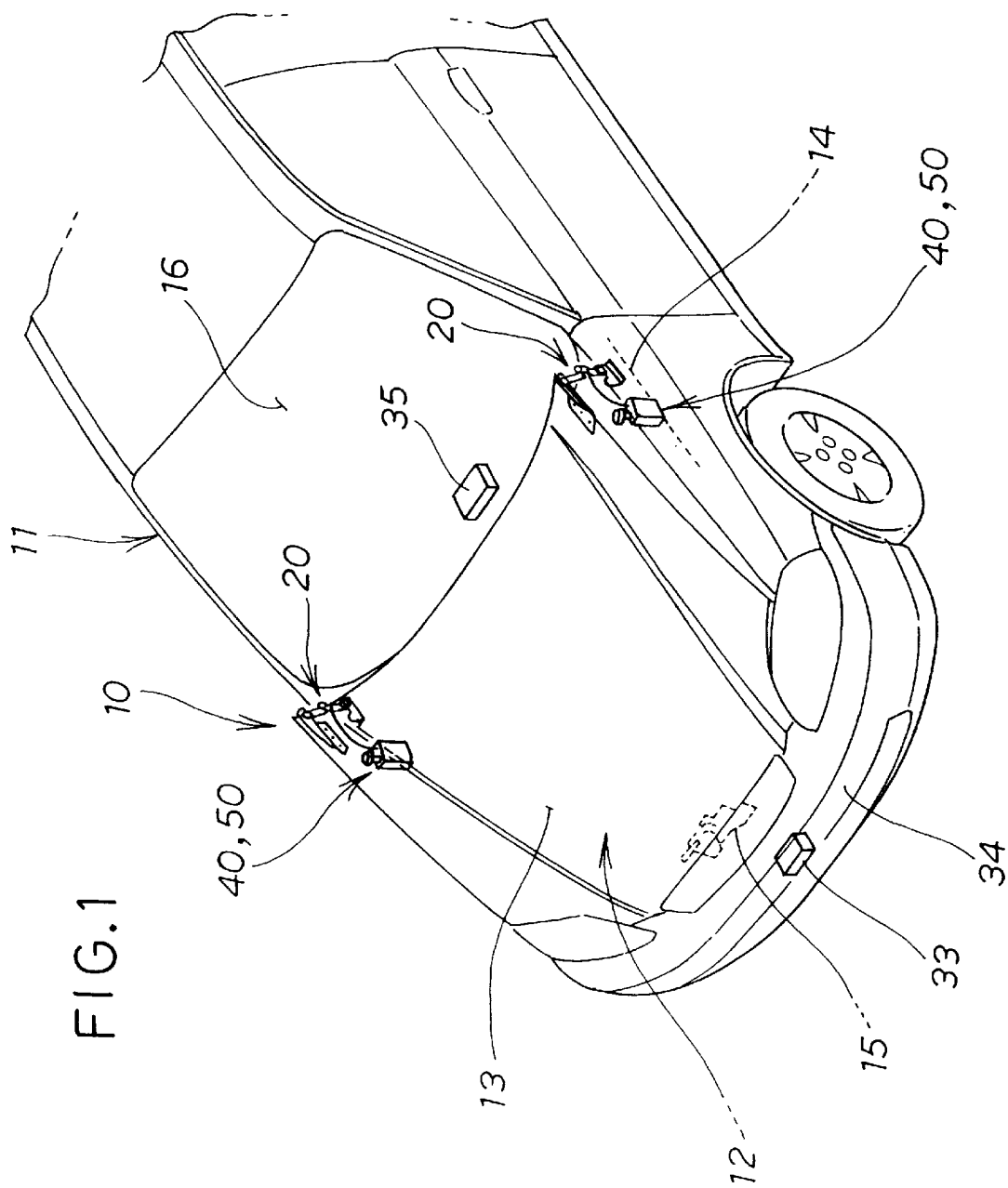
FIG. 1 is a partial schematic perspective view illustrating a vehicle employing a hood apparatus according to a first embodiment of the present invention.
Figure 2:
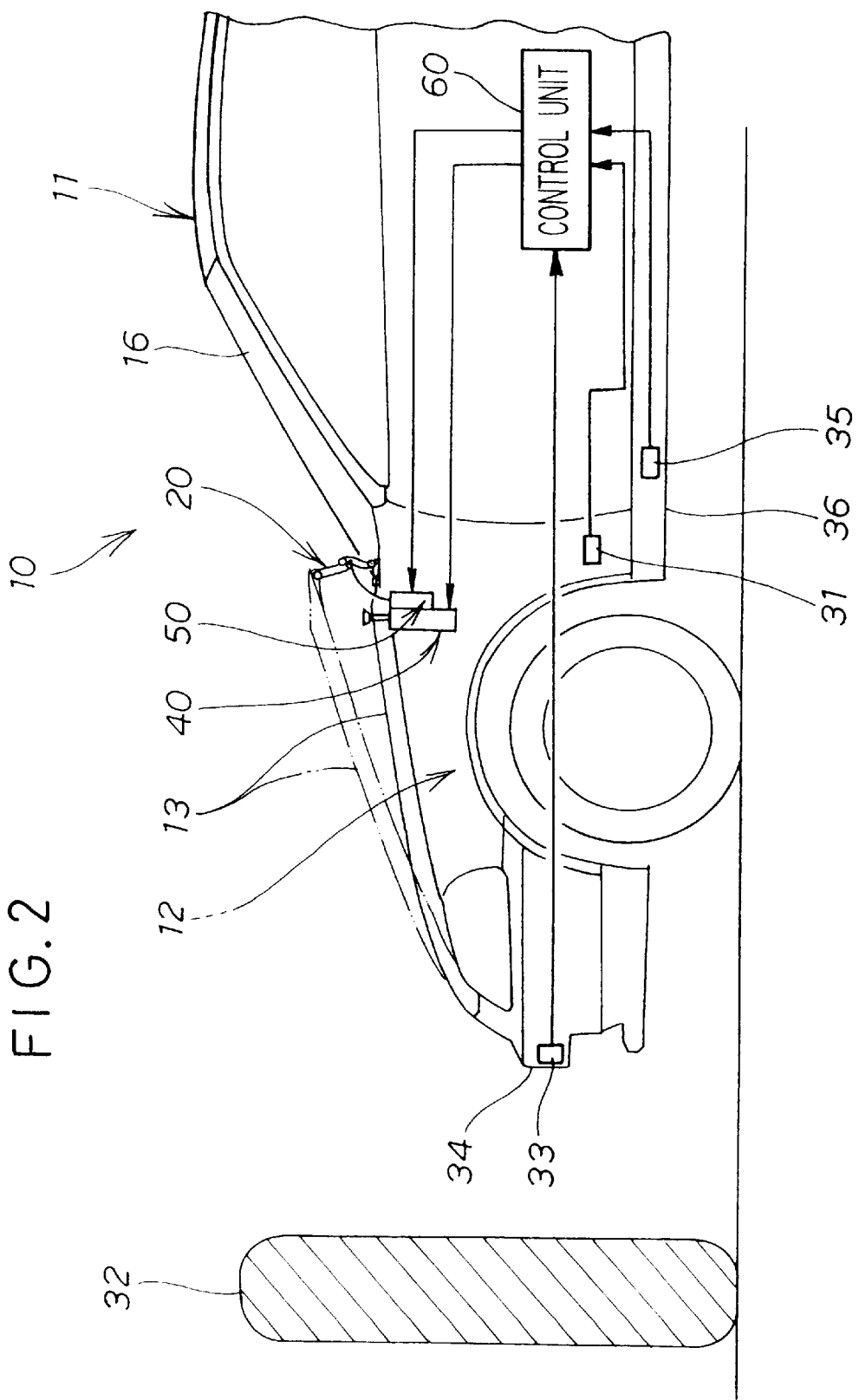
FIG. 2 is a side elevational view illustrating the vehicle of FIG. 1.

Initial reference is made to FIGS. 1 and 2 illustrating a vehicle 11 employing a vehicle hood apparatus 10 according to a first embodiment of the present invention. As shown in FIGS. 1 and 2, the vehicle 11 has an engine room or compartment 12 with an opening covered by a hood 13. Rear end of the hood 13 is secured to a vehicle body frame 14 by means of right and left retaining mechanisms 20, 20 disposed on the body frame 14 such that it can make opening and closing actions. Front part of the hood 13 is normally locked to the body frame 14 through a hood lock 15. Reference numeral 16 designates a windshield.

Hood apparatus 10 comprises the right and left hoodretaining mechanisms 20, 20, a vehicle velocity sensor 31 for detecting a vehicle velocity, bumper and floor sensors 33, 35, right and left hood-lifting actuators 40, right and left hood-returning actuators 50 and a control unit 60. The bumper sensor 33 is secured to a front bumper 34 of the vehicle 11. The floor sensor 35 is secured to a floor 36 of the vehicle 11. When the vehicle 11 collides with a forward obstacle 32, those sensors 33, 35 detect the collision and output corresponding signals. Each sensor 33, 35 comprises an acceleration sensor. The hood-lifting actuators 40 upwardly lift a rear end of the closed hood 13 when the vehicle hit an obstacle. The hood-returning actuators 50 return the lifted end of the hood 13 to its original position. The control unit 60 controls the hood-lifting actuators 40 and the hood-returning actuators 50 on the basis of signals output from the vehicle velocity sensor 31, bumper sensor 33 and floor sensor 35. The control unit 60 consists chiefly of a microcomputer. The present invention may include only the vehicle velocity sensor 33 instead of both the vehicle velocity sensor 33 and the floor sensor 35.

Figure 3:
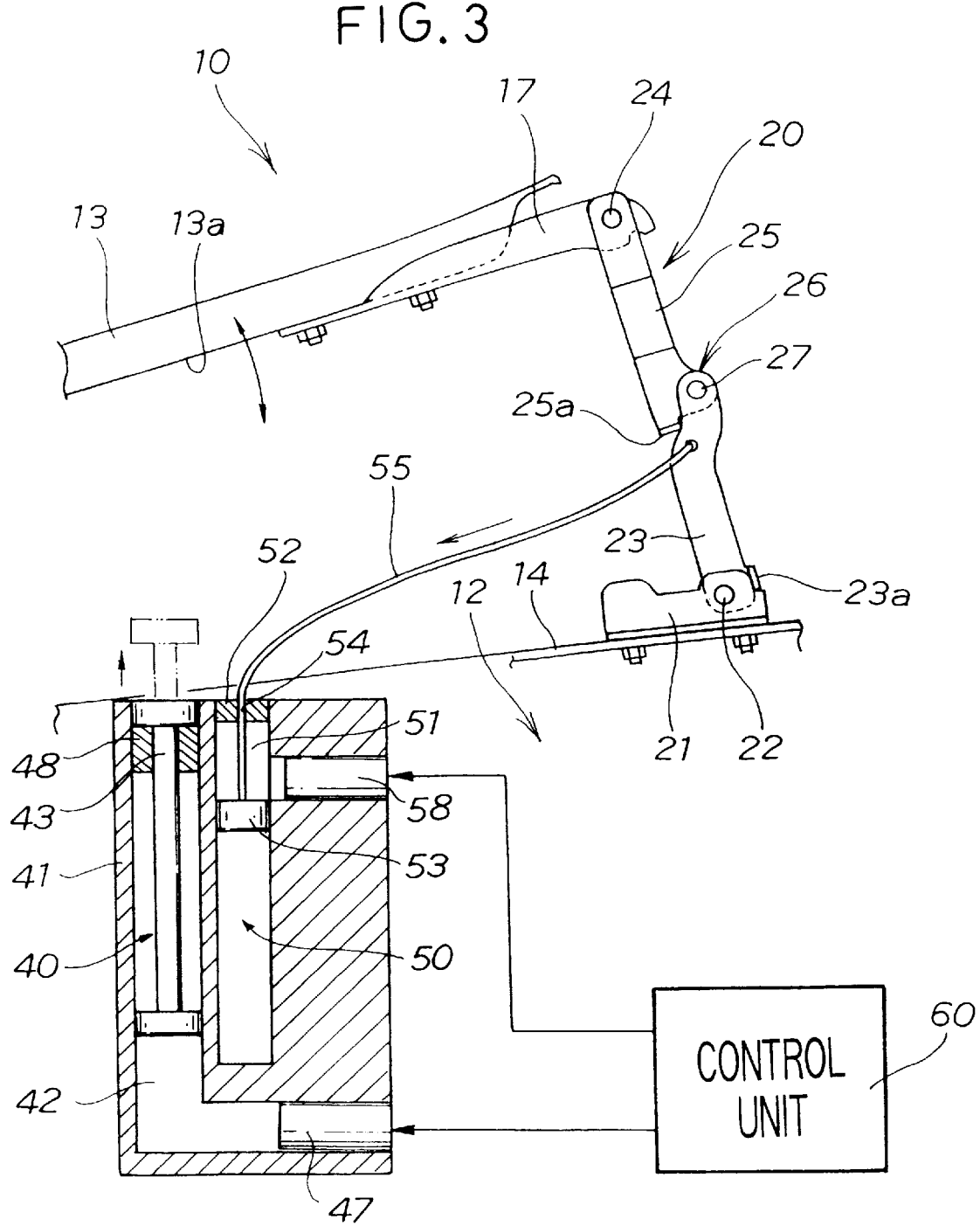
FIG. 3 is a schematic view showing, partially in section, the general arrangement of the hood apparatus of FIG. 2.

Reference is made next to FIG. 3 wherein the hood 13 is shown with its rear end lifted. The hood 13 Includes a swing arm 17 extending backwardly. Each hood-retaining mechanism 20 includes a bracket 21 bolt-fastened to the vehicle body frame 14. Lower link 23 has one end pivotally connected to the bracket 21 by means of a first pin 22. Upper link 25 has one end pivotally connected to the swing arm 17 by means of a second pin 24. Opposite ends of the lower and upper links 23, 25 are rotatably connected with each other by means of a third pin 27 at a hinged portion 26.

Both the right hood-lifting actuator 40 and right hoodreturning actuator 50 are housed in a right single housing 41 connected to the body frame 14. Similarly, both the left hood-lifting actuator 40 and left hood-returning actuator 50 are housed in a left single housing 41 connected to the body frame 14.

Each hood-lifting actuator 40 comprises a cylinder 42 formed in the housing 41 and opened upwardly, a piston 43 fitted reciprocally movable in the cylinder 42, a lifting inflator 47, and a stopper 48.

Each hood-returning actuator 50 comprises a cylinder 51 formed in the housing 41 and opened upwardly, a seal 52 for sealing an upper part of the cylinder 51, a piston 53 fitted reciprocally movably in the cylinder 51, a returning wire 55 extending outwardly through a hole 54 of the seal 52, and a returning inflator 58. Top end of the returning wire 55 extending outwardly from the seal 52 is connected to the lower link 23 proximately to its opposite end.

When fed with an electrical signal from the control unit 60, the lifting and returning inflators 47, 58 ignite a gas generating agent by means of an ignition device, not shown, to thereby generate a large quantity of gas. The generated gas is fed into the cylinders 42, 51. The cylinders 42, 51 are pressurized by the fed gas temporarily. As a result, the lifting piston 43 ascends while the returning piston 53 descends. Although not shown, the cylinders 42, 51 have an orifice of small diameter so that their internal pressures decline after lapse of a short period of time.

As the lifting inflator 47 is fed with a control signal (hood-lift signal), the piston 43 of the hood-lifting actuator 40 ascends a predetermined stroke since the pressure within the cylinder 42 rises temporarily. Thereafter, the piston 43 descends to Its original position in correspondence with the fall of the internal pressure of the cylinder 42.

In contrast, as the returning inflator 58 is fed with a control signal (hood-return signal), the piston 53 of the hood-returning actuator 50 descends a predetermined stroke since the internal pressure of the cylinder 51 rises temporarily. By the descending movement of the piston 53, the returning wire 55 is pulled down to move the upper part of. the lower link 23 forwardly, whereby the lower link 23 pivots or swings forwardly about the first pin 22.

Discussion will be made next as to the control of the control unit 60 with reference to FIGS. 2 and 4.

STEP (hereinafter simply "ST") 01: Determination is made as to whether vehicle speed Vc detected by the vehicle velocity sensor 31 is higher than a reference speed Vo (e.g., higher than 20–30 km/hr). When the detected vehicle speed Vc is higher than the reference speed Vo, the control proceeds to ST 02. When the detected vehicle speed Vc is lower than the reference speed Vo, the control returns to ST 01.

ST 02: Determination is made as to whether the bumper sensor 33 is ON, that is, it is fed with a detected signal from the bumper sensor 33. When the bumper sensor 33 is ON, the control proceeds to ST 03. When the bumper sensor 33 is OFF. the control returns to ST ST 01.

ST 03: Determination is made as to whether the floor sensor 35 is ON, that is, it is fed with a detected signal from the floor sensor 35. When the floor sensor 35 is ON, the control proceeds to ST 04. When the floor sensor 35 is OFF, the control returns to ST 01. The floor sensor 35 outputs a detected signal when, for example, it detects acceleration lower than a preset, predetermined value of acceleration. Accordingly, In ST 03, the obstacle 32 hit by the vehicle 11 is determined to be a light-weight obstacle as the floor sensor 35 is ON.

As can be appreciated from the above discussion, only when all determinations in ST 01 to ST 03 are YES, it is determined that the vehicle 11 has collided with an obstacle 32 weighing less than a predetermined weight. When the vehicle hood apparatus 10 is not provided, ST 03 is not required.

ST 04: When all determinations in ST 01–ST 03 are YES, the control unit 60 outputs a hood lift signal. The hood-lifting actuator 40 is actuated in response to the hood lift signal ON.

ST 05: Timer gets started. Then, the control proceeds to ST 06.

ST 06: Determination is made as to whether the timer's counted time Tc is longer than a reference time To (e.g., 0.1–0.5 sec.). When it is YES, the control proceeds to ST 07. When it is NO, ST 06 is repeated.

ST 07: The hood return signal is put ON to thereby complete the control. Based on the hood return signal ON corresponding to the predetermined lapse time from the timer, the hood-returning actuator 50 is actuated to return the hood 13 to its original position.

As is apparent from the above discussion, ST 01–ST 03 are dedicated to determine the collision of the vehicle 11 with the obstacle 32 while ST 05–ST 06 are dedicated to time a predetermined time lapsed from the lift of the hood 13.

Figure 5:
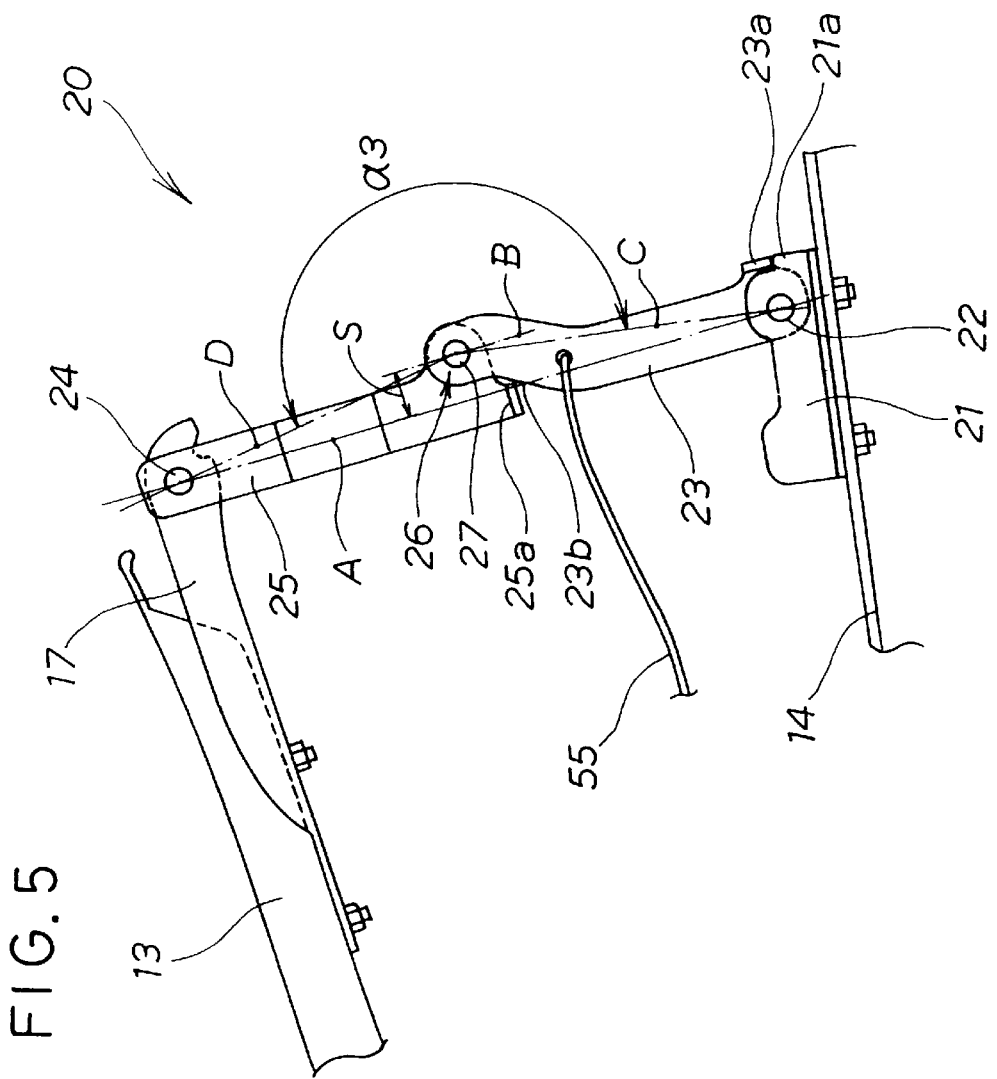
FIG. 5 is a schematic view illustrating a hood-retaining mechanism shown in FIG. 3.

Reference is made next to FIG. 5 illustrating one hood-retaining mechanism 20. The retaining mechanism 20 is provided to keep the lifted rear part or tail of the hood 13 in its lift position. With the hood tail lifted, that is, with the upper and lower links 25, 23 extended linearly, the hinged portion 26 is arranged to become offset a distance S in a direction toward the back of the vehicle (rightwardly in the FIG.) rather than to connect the upper and lower links 25, 23 to extend linearly. More specifically, line B passing over the, center of the third pin 27 of the hinged portion 26 is offset a distance S in a direction toward the back of the vehicle from a straight line A passing over the center of the first pin 22 of the lower link 23 and the center of the second pin 24 of the upper link 25. With the thus-offset hinged portion 26, the hood-retaining mechanism 20 can flex in correspondence with the vertical movement of the hood 13.

The flexible hood-retaining mechanism 20 comprises an upper link stopper 25a for restricting the opening of the upper and lower links 25, 23 beyond a full-open angle 3 wherein the links 25, 23 lie linearly, and a lower link stopper 23a. More specifically, the lower link 23 has the lower link stopper 23a formed integrally therewith and projecting from a lower rear part thereof for engagement with and disengagement from the bracket 21, while the upper link 25 has the upper link stopper 25a formed integrally therewith and projecting from a lower frontal part thereof for locking engagement with the stretched or extended lower link 23.

By abutment of the lower link stopper 23a against a rear upper end 21a of the bracket 21, the lower link 23 is prevented from further backward rotation about the first pin 22. By abutment of the upper link stopper 25a against an upper frontal end 23b of the lower link 23, the upper link 25 is prevented from further backward rotation about the second pin 24. The full-open angle 3 is maintained in this manner.

Operation of the hood-retaining mechanism 20 will now be described with reference to FIGS. 6 to 9.

Figure 6:
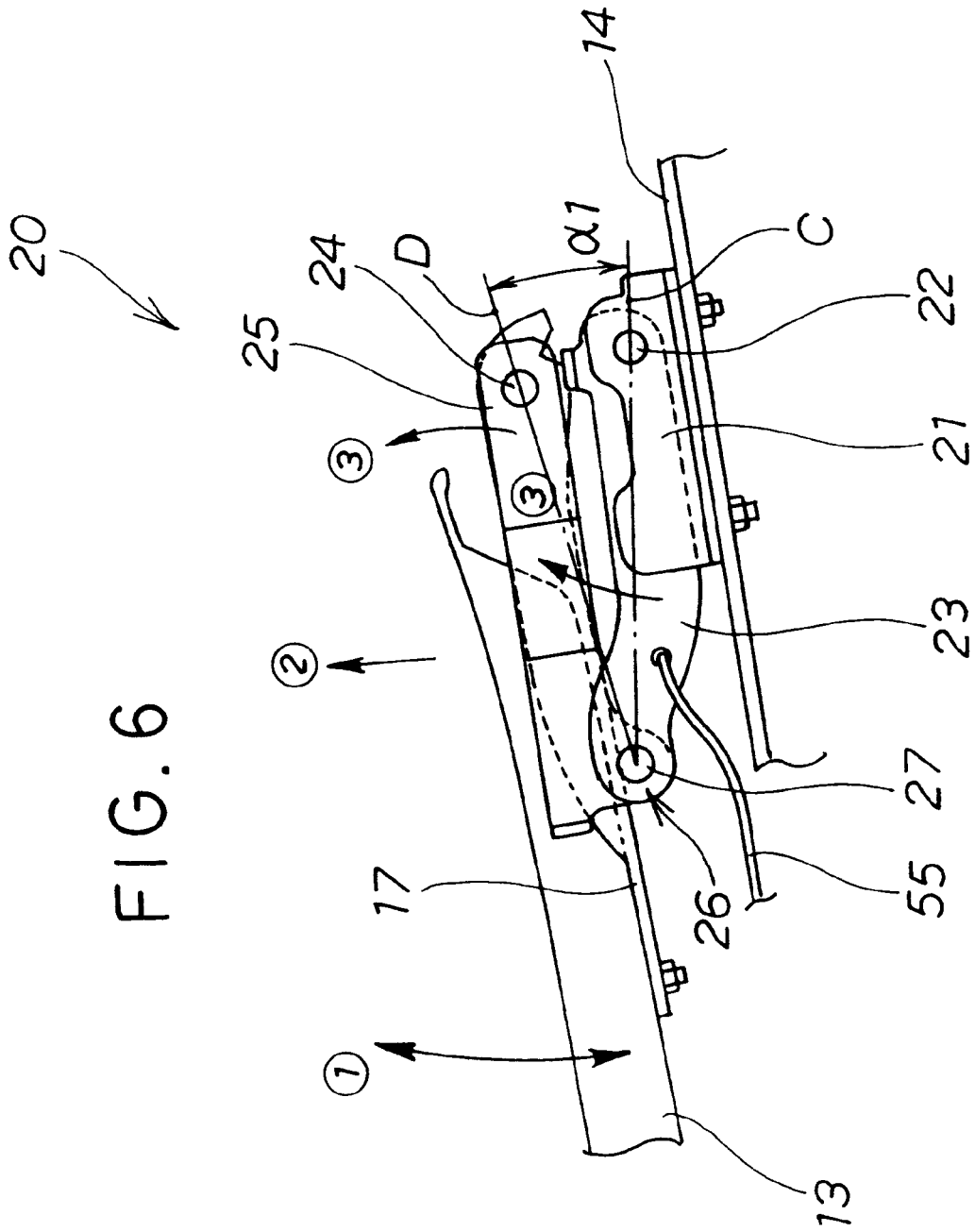
FIG. 6 is a view illustrating a normal state in which a flexible link forming the hood-retaining mechanism is folded to keep the hood at its lowermost position to thereby close the engine room.

In FIG. 6, the hood 13 is placed In Its normal position in which the engine room is closed. At this time, the retaining mechanism 20 is held in a folded state with the hinged portion 26 positioned forwardly of the first and second pins 22, 24.

Straight line C passes over the centers of the first and third pins 22, 27 while another straight line D passes over the centers of the second and third pins 24, 27. The straight lines C and D intersect with each other at the center of the third pin 27 to provide an angle 1 therebetween. The angle 1 is acute and formed as the upper and lower links 25, 23 are placed in a fully folded state.

As shown by arrow (1), the hood 13 is rotatable vertically about the second pin 24. When the rear end of the hood 13 is lifted or moved in a direction of arrow (2) with the front part of the hood 13 locked to the vehicle body frame, the upper link 25 starts a swinging movement about the third pin 27 while the lower link 23 starts a swinging movement in a direction of arrow (3) about the first pin 22.

Figure 7:
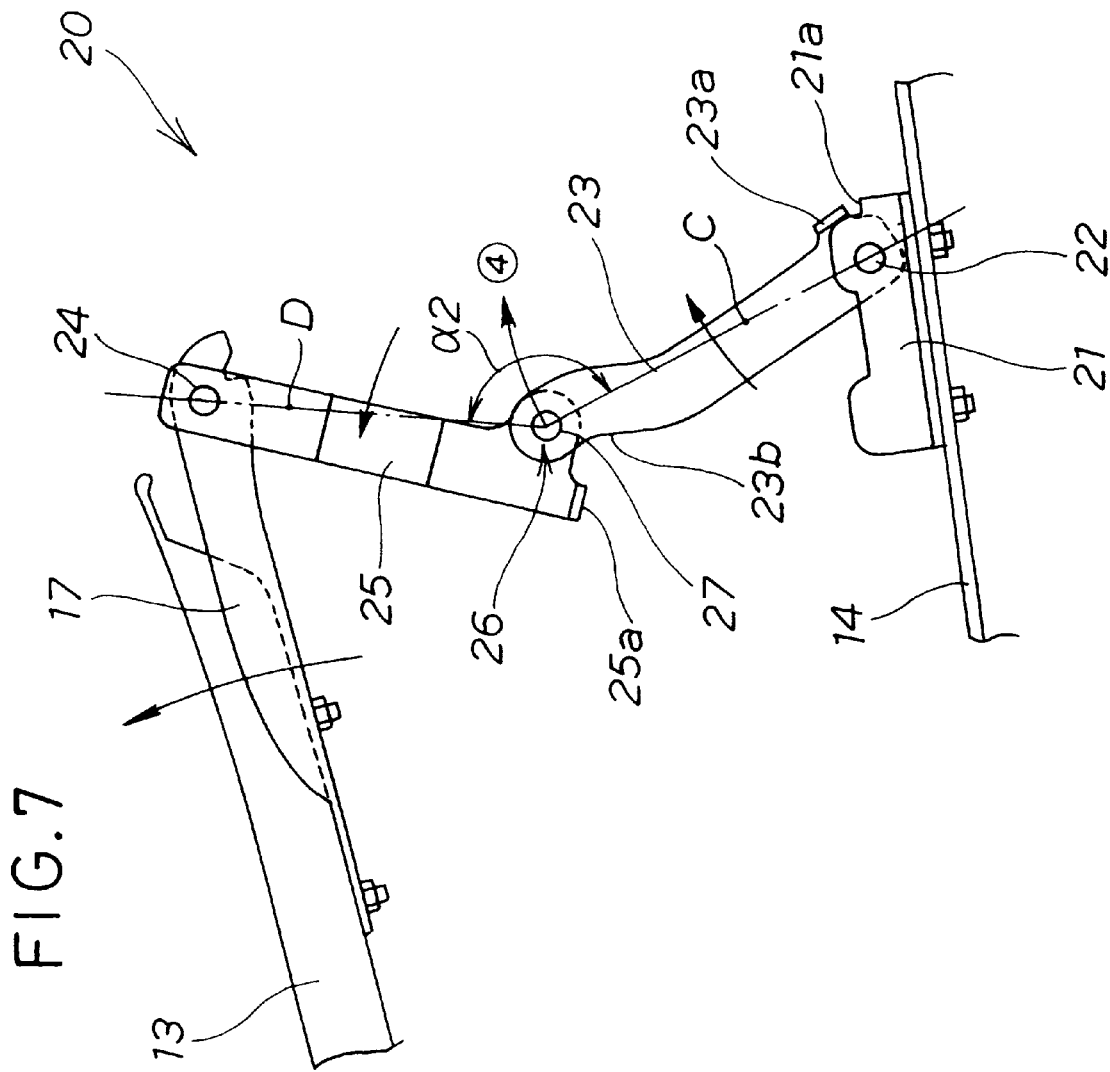
FIG. 7 illustrates an operation of the hood-retaining mechanism with its flexible link opened halfway and the hood lifted from the position of FIG. 6.

Turning now to FIG. 7, the hood. 13 is shown with its tail end lifted. Since the upper and lower links 25, 23 make swinging movements, the third pin 27 moves toward the back of the vehicle (rightward in the FIG.), as shown by arrow (4). An angle formed at this time by the straight lines C and D is 2. This angle 2 is obtuse and larger than the full-close angle 1 shown in FIG. 6. That is, the flexible link formed by the lower and upper links 23, 25 open wider with the amount of lift of the hood 13.

Figure 8:
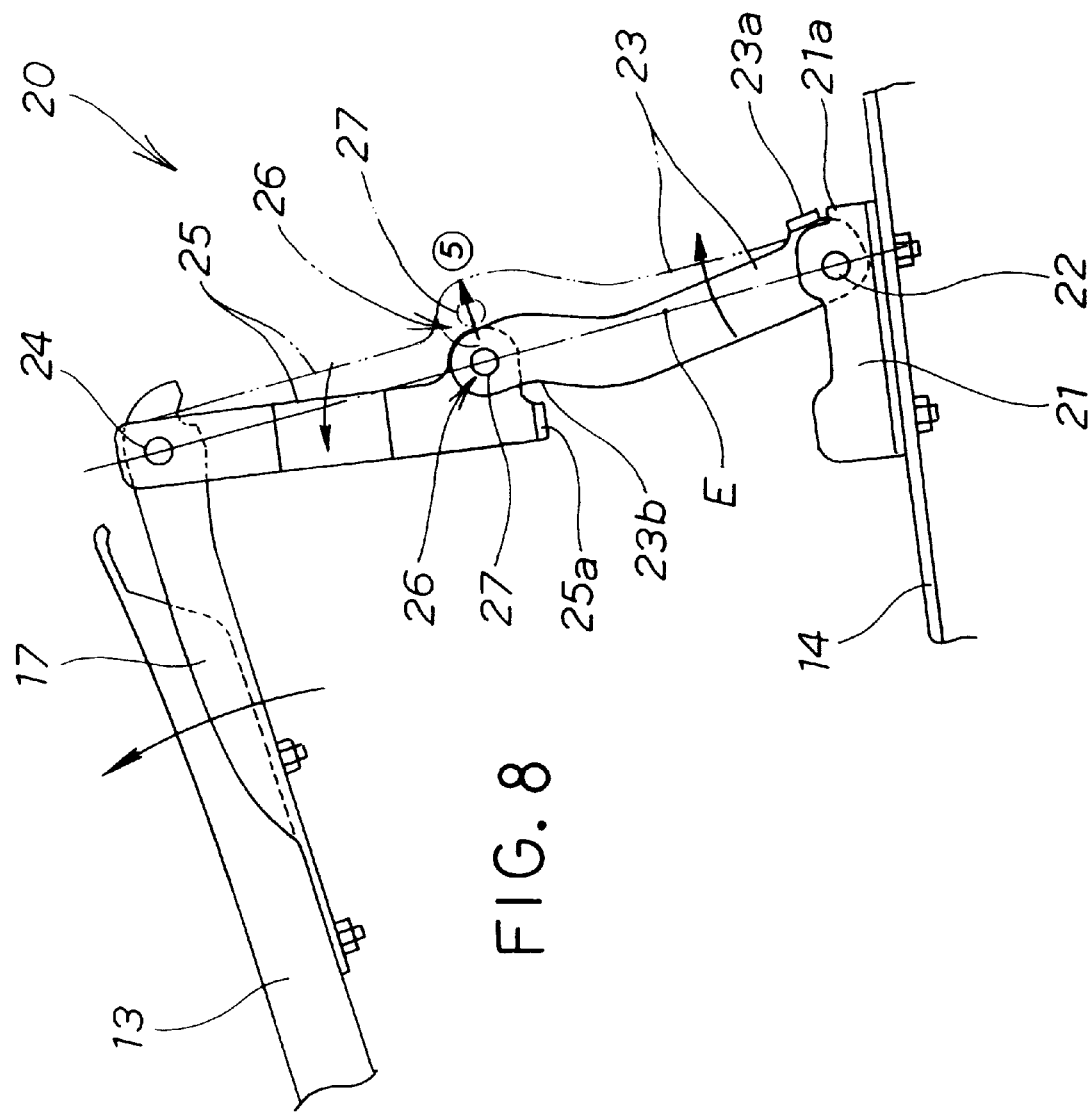
FIG. 8 illustrates an operation of the hood-retaining mechanism with its flexible link opened wider and the hood lifted higher.

In FIG. 8, the rear end of hood 13 is lifted higher than in FIG. 7 so that the first pin 22, second pin 24 and third pin 27 all lie on a straight line E. As the hood 13 pops up, inertia is produced. This inertia causes the third pin 27 to move toward the back of the vehicle, that is, in. a direction of arrow (5), as shown by a double-dot-and-dash line, away from the straight line E. In other words,the hinged portion 26, which is positioned toward the front of the vehicle as the hood is closed and the flexible link forming the hood-retaining mechanism 20 is folded, is moved toward the back of the vehicle, thereby gradually lifting the hood 13 and bringing the flexible link into an upright state.

When the third pin 27 is moved away from the straight line E toward the back of the vehicle, the lower link stopper 23a abuts against rear upper end 21a of the bracket 21 while the upper link stopper 25a abuts against the upper front end 23b of the lower link 23. The flexible link consisting of the lower and upper links 23, 25 of the hood-retaining mechanism 20 stands upright linearly and maintains its upright position. Angle formed at this time by the straight lines C and D is 3. This angle 3 is provided when the flexible link is fully open. It is larger than the angle 2 of FIG. 7 and exceeds 180°. The tail end of the hood 13 is lifted to its maximum position. When the hood 13 is thus lifted the predetermined amount, the flexible link is kept at the upright, full-open angle 3 by the lower link stopper 23a and upper link stopper 25a and does not open wider than the full-open angle.

As is apparent from the above discussion, the angle of the flexible link varies from the full-close angle 1 of FIG. 6 in which the hood 13 is lowered, to the full-open angle 3 of FIG. 5 in which the hood 13 is lifted.

Figure 9:
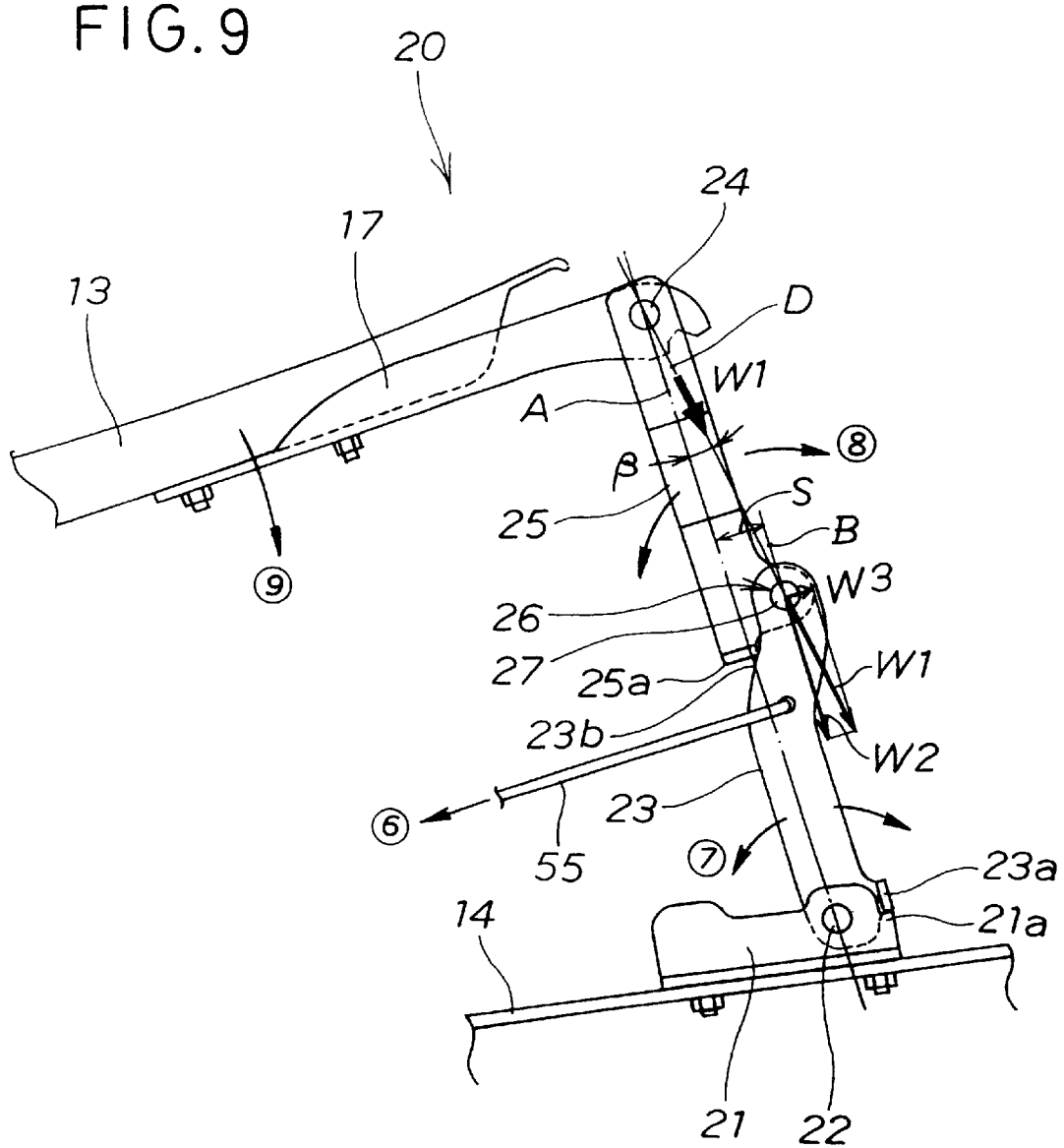
FIG. 9 illustrates an operation of the hood-retaining mechanism as the hood is lifted a predetermined amount.

Referring to FIG. 9, discussion will be made next as to an operation of the hood-retaining mechanism 20 as the rear end of the hood 13 is lifted a predetermined amount, particularly as to an operational force applied to the third pin 27.

Since the lower link stopper 23a abuts against the bracket 21 as the rear end of the hood 13 is lifted a predetermined amount, the lower link 23 cannot rotate clockwise about the first pin 22. Since the upper link stopper 25a abuts against the lower link 23, the upper link stopper 25 cannot rotate counterclockwise about the third pin 27. With the front part of the hood 13 locked to the vehicle body frame 14 by means of the hood lock 15 (see FIG. 1), the hood 13 cannot move back and forth. Consequently, the upper link 25 cannot rotate clockwise about the third pin 27, either.

As the lower and upper links 23, 25 are held in an upright state, the hinged portion 26 is displaced toward the back of the vehicle from the straight line A passing over the centers of the first and second pins 22, 24. Consequently, the straight line D passing over the centers of the second and third pins 24, 27 lies inclined an angle relative to the straight line A.

When a downward load W1 along the straight line D is applied from the hood 13 to the second pin 24, the load W1 is also applied to the third pin 27. The load W1 applied to the third pin 27 branches Into a downward partial load W2 and a sideways or backward partial load W3 in correspondence with the angle. The partial load W3 provides a force for rotating the lower link 23 clockwise about the first pin 23. However, the lower link 23 cannot rotate because the stopper 23a is held in locking engagement with the bracket 21 as mentioned above.

As can be readily appreciated, when the rear end of the hood 13 is lifted a predetermined amount, the weight of the hood 13 is normally applied to the hinged portion 26 to thereby urge the hinged portion backwardly of the vehicle. Thus, the lower link 23 and the upper link 25 do not fold forwardly about the hinged portion 26, whereby the flexible link is maintained in its upright position. Consequently, the lift position of the hood 13 can be fixedly retained by the hood-retaining mechanism 20. This makes it unnecessary to provide the hood-lifting actuator 40 (see FIG. 3) with a mechanism for retaining the lifted hood 13. It also becomes unnecessary to connect the hood-lifting actuator 40 to the hood 13 or the hood-retaining mechanism 20.

In the upright state of the hood-retaining mechanism 40, as the returning wire 55 is pulled toward the front of the vehicle as shown by arrow (6), the lower link 23 rotates counterclockwise about the first pin 22 as shown by arrow (7). The upper link 25 rotates clockwise about the third pin 27 as shown by arrow (8). Consequently, the hood-retaining mechanism 20 is gradually folded so that the rear end of the hood 13 is brought down, as shown by arrow (9), until it comes to its original position.

Operation of the thus-arranged hood apparatus 10 will be described below with reference to FIGS. 10 to 14.

Figure 10:
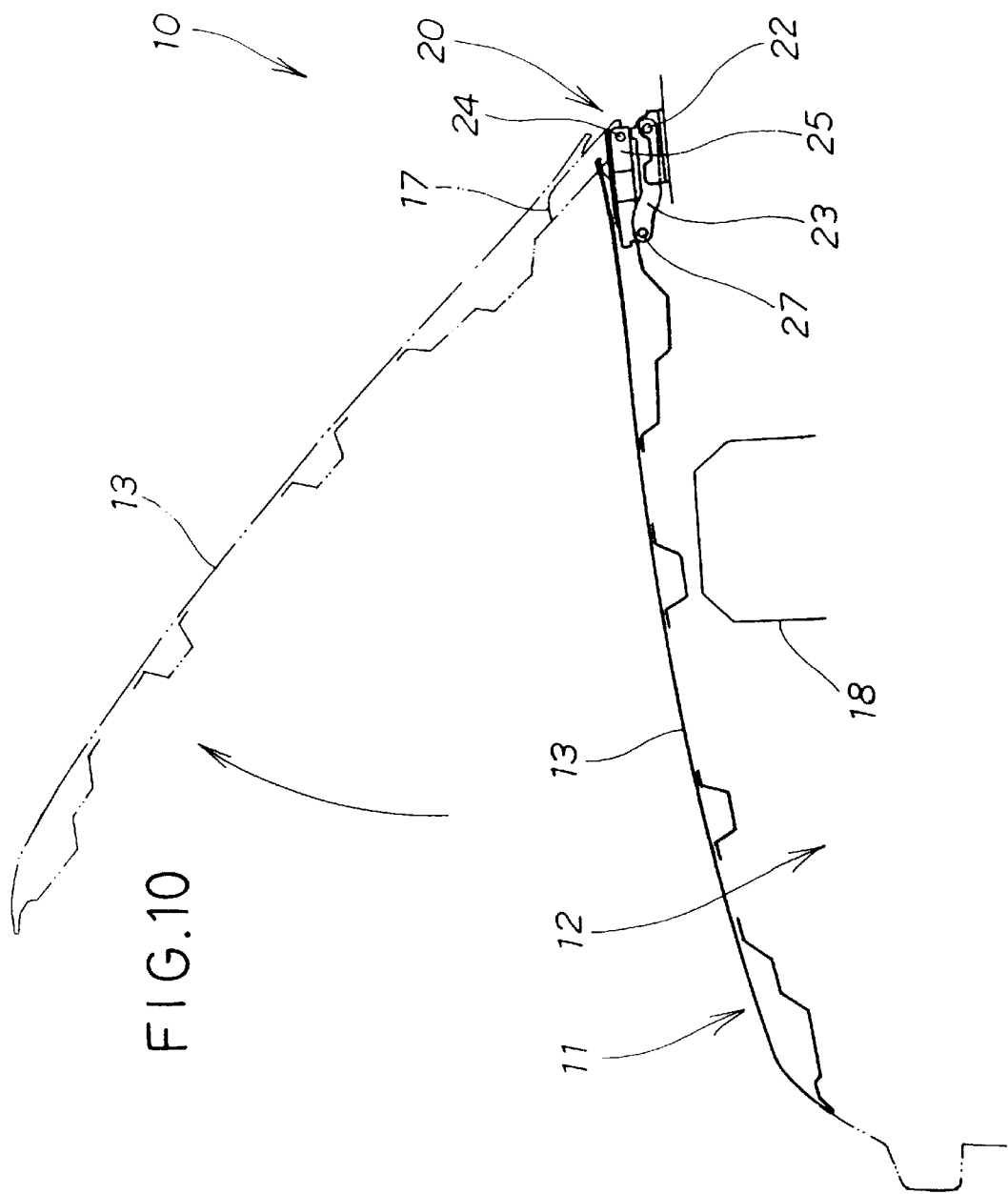
FIG. 10 is a schematic side view illustrating a normal state in which the hood is lowered to its initial position to close the engine room.

In FIG. 10, the hood 13 is shown lowered to cover the engine room 12 with the hood-retaining mechanism 20 folded. The hood 13 is rendered capable of opening and closing actions about the second pin 24. By opening the hood 13 as shown by a phantom line, maintenance and inspection can be performed with respect to equipment 18 housed in the engine room 12.

Figure 11:
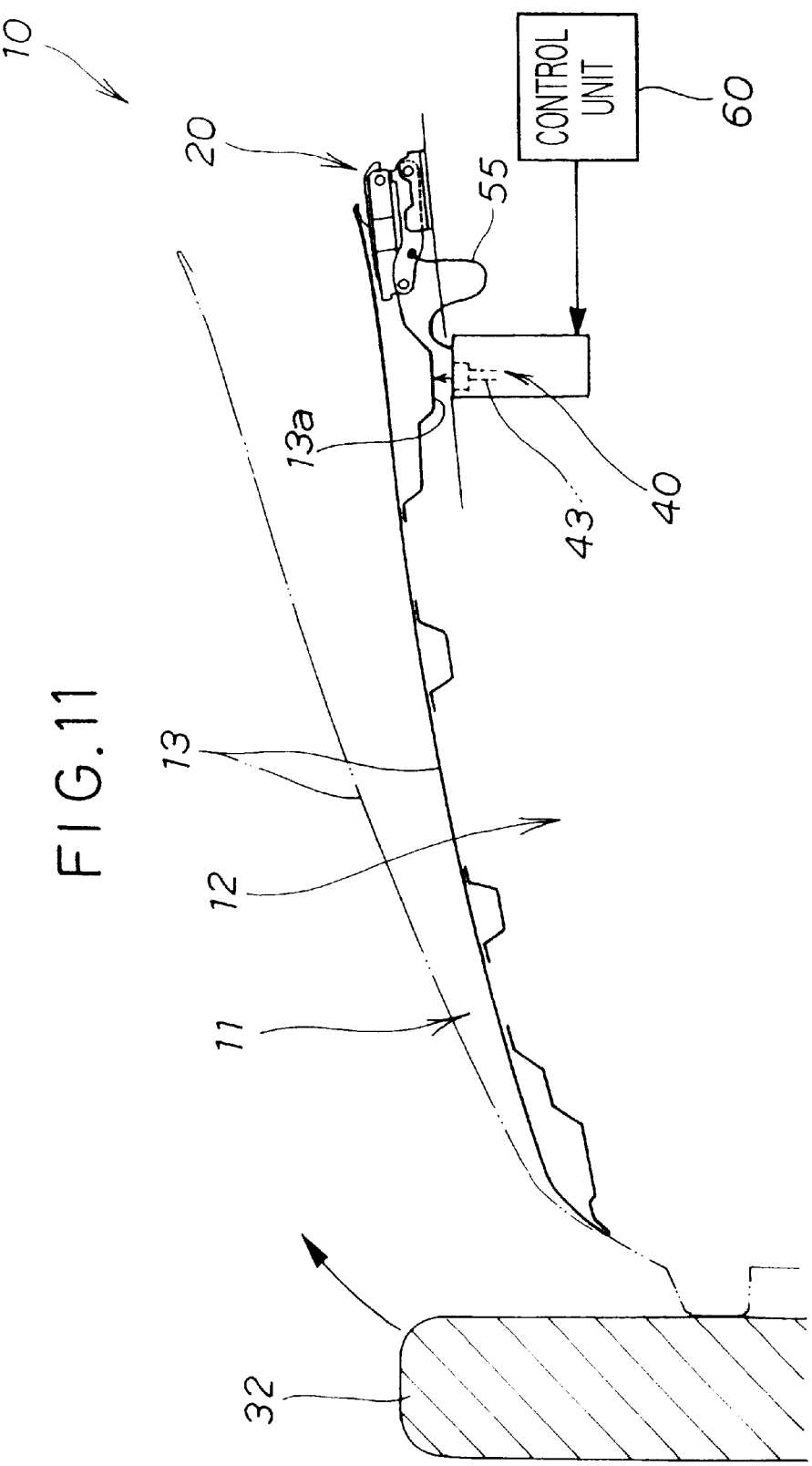
FIG. 11 illustrates an operation of the hood apparatus upon collision of the vehicle with an obstacle.

Referring to FIG. 11, the vehicle 11 is shown with the obstacle 32 hit thereby. When the vehicle 11 hits the obstacle 32 while running at a higher speed than a predetermined vehicle speed, the control unit 60 outputs a hood-lift signal. Based on this signal, the hood-lifting actuator 40 starts a lifting action such that the piston 43 pops up at a high speed to thrust an undersurface 13a of the rear end of the hood 13 upwardly.

Figure 12:
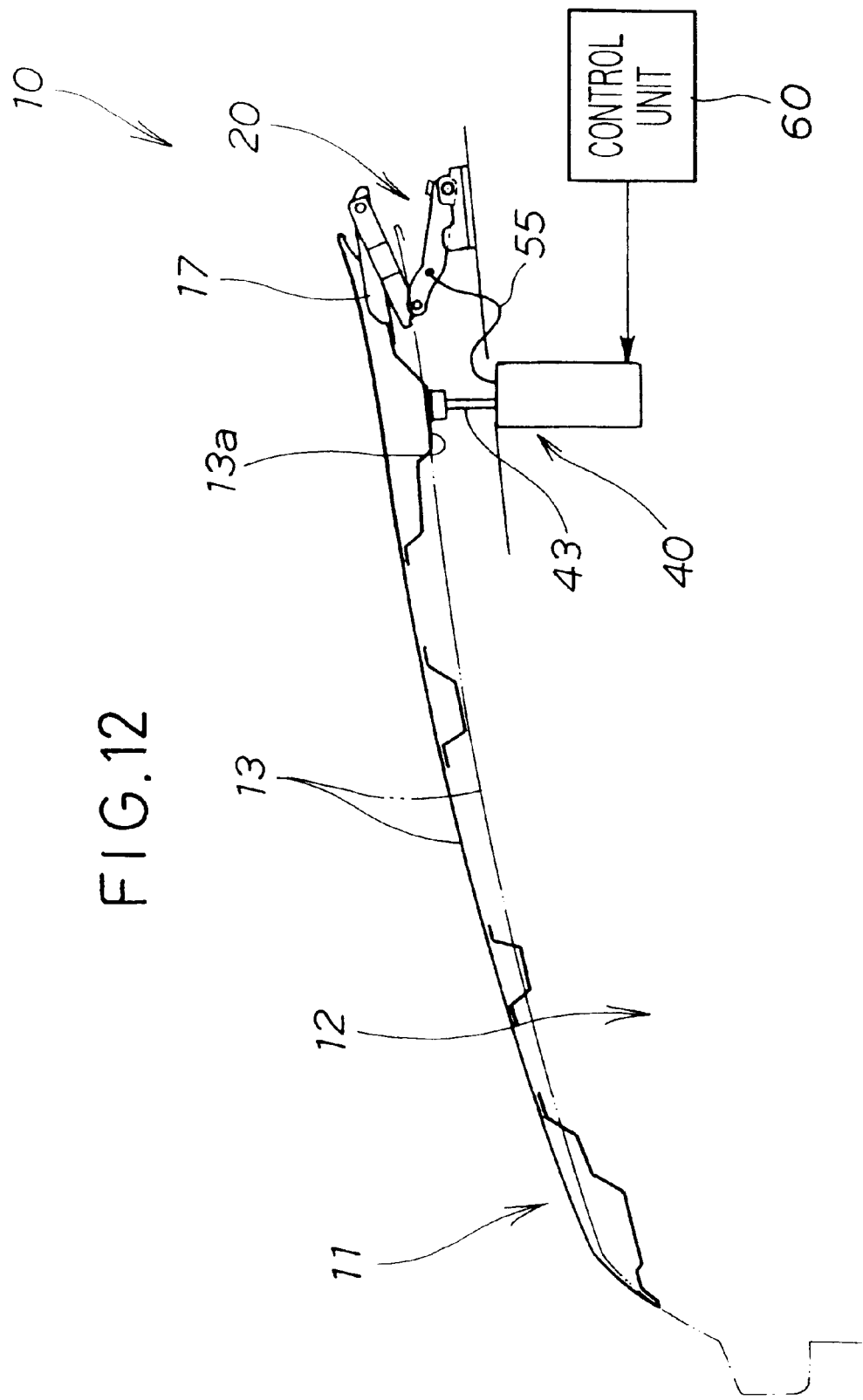
FIG. 12 illustrates an operation of a hood-lifting actuator upon collision of the vehicle with the obstacle, the actuator being actuated to cause a piston to thrust the hood upward.

By thus instantly pushing up the rear end of the hood 13 upwardly through the piston 43, the hood 13 is thrust up from the original or normal level shown by a phantom line to the level shown by a solid line, as shown in FIG. 12. The instantly thrust-up hood 13 is lifted higher by inertia. The hood-retaining mechanism 20 comes to stand upright as the rear end of the hood 13 rises higher.

Figure 13:
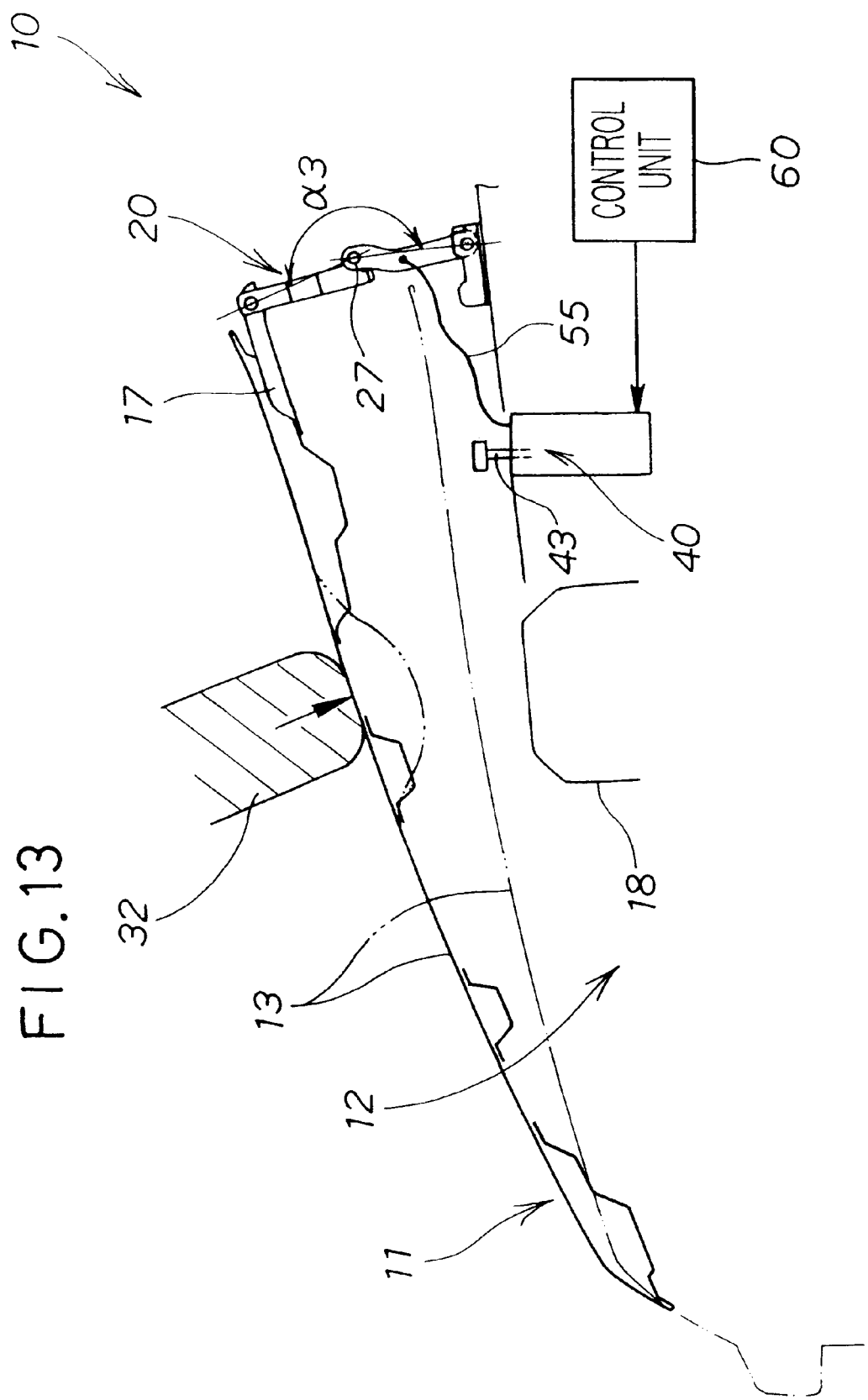
FIG. 13 is a schematic view illustrating the hood apparatus with its hood lifted and retained in that state by the hood-retaining mechanism.

In FIG. 13, the hood-retaining mechanism 20 is brought to form the full-open angle 3 and held in its upright position. The hood rear end does not rise any further and is retained by the hood-retaining mechanism 20 at a solid-lined position elevated a predetermined height (e.g., 100 to 200 mm) from the phantom-lined original position.

Predetermined space is defined between the predetermined-height-lifted hood 13 and the equipment 18 such as an engine housed in the engine room 12, thereby making the hood 13 deformable downwardly. Thus, when the obstacle 32 bumped against the hood 13, the lifted hood 13 can be deformed, as shown by a phantom line, to thereby sufficiently absorb an impact of the obstacle 32. This not only protects the equipment or engine 18 from the obstacle 32 but also reduces an impact applied to the obstacle 32.

Figure 14:
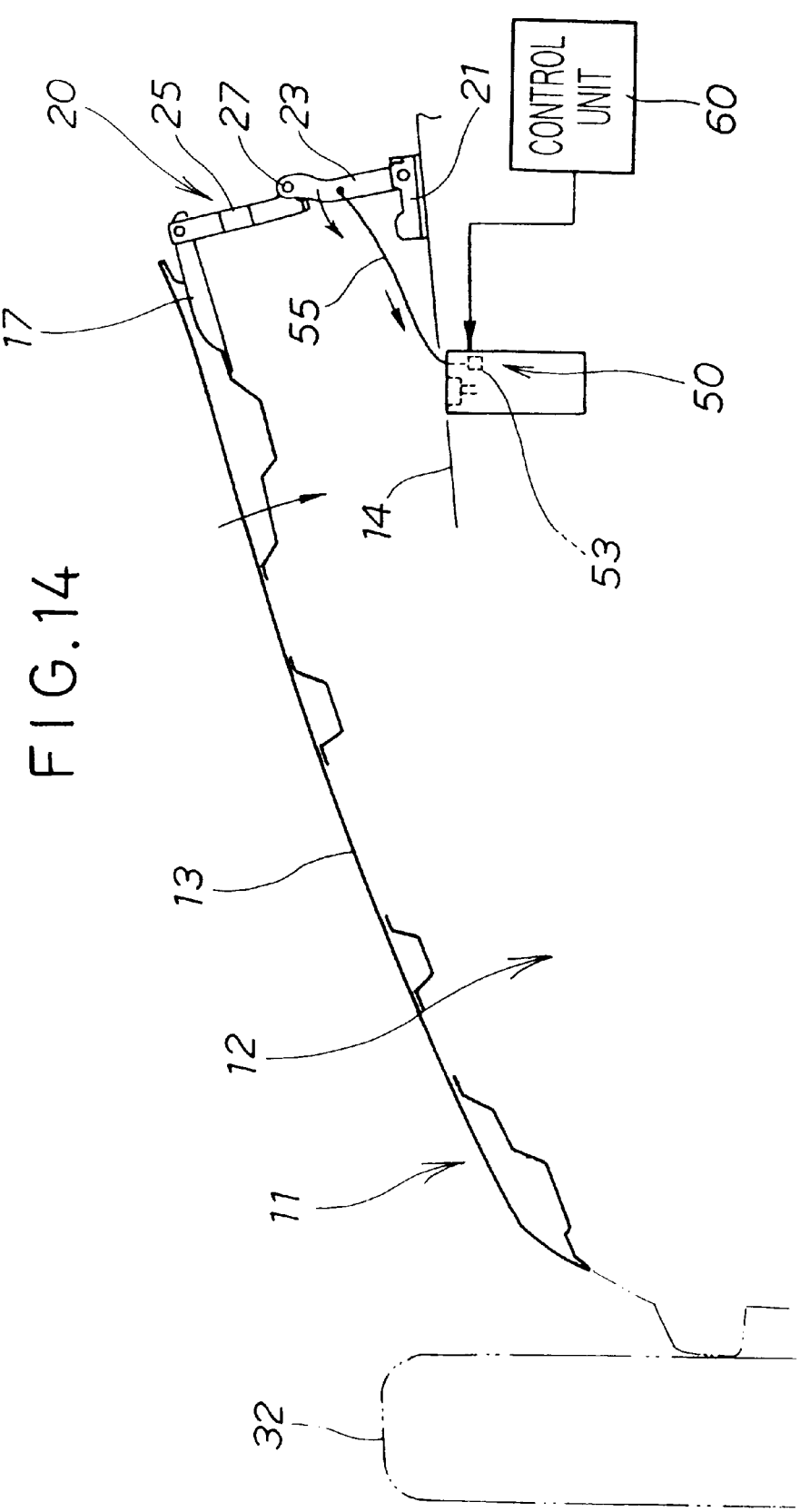
FIG. 14 is a schematic view illustrating an operation of the hood apparatus after lapse of a predetermined time from the collision of the vehicle with the obstacle, with the hood-returning actuator actuated and the flexible link being folded by the returning wire.

When the vehicle 11 collided with the obstacle 32, the hood 13 is brought into its lifted position as shown in FIG. 14. As a predetermined time has elapsed from the lift of the hood 13, the control unit 60 determines that the obstacle 32 will no longer bump onto the hood 13 and outputs a hood-return signal. Based on this signal, the hood-returning actuator 50 starts its returning action and instantly pulls in the returning wire 55. As a result, the hood-retaining mechanism 20 is folded to cause the hood 13 to be lowered until the latter comes to its original lowermost position.

It may be readily appreciated by skilled artisans that the present invention should not be limited to the above-described embodiment. For example, the invention may be embodied such that the hood-retaining mechanism 20 is mounted directly to the hood 13 and the vehicle body frame 14, thereby omitting the swing arm 17 and the bracket 21.

Although the above embodiment has been described as having the hood-lifting and hood-returning actuators 40, 50 disposed on both sides of the vehicle, the present invention should not be construed as being limited thereto. An alternative arrangement may be possible. For example, only one of each of the actuators 40, 50 may be provided on the vehicle for effecting the lifting and returning of the hood 13.

The hood-lifting actuator 40 and the hood-returning actuator 50 may be provided separately instead of being housed in the single housing 41.

The timer for timing the predetermined time from the lift of the hood 13 may be built in the control unit 60 or disposed independently of the unit 60.

Figure 4:
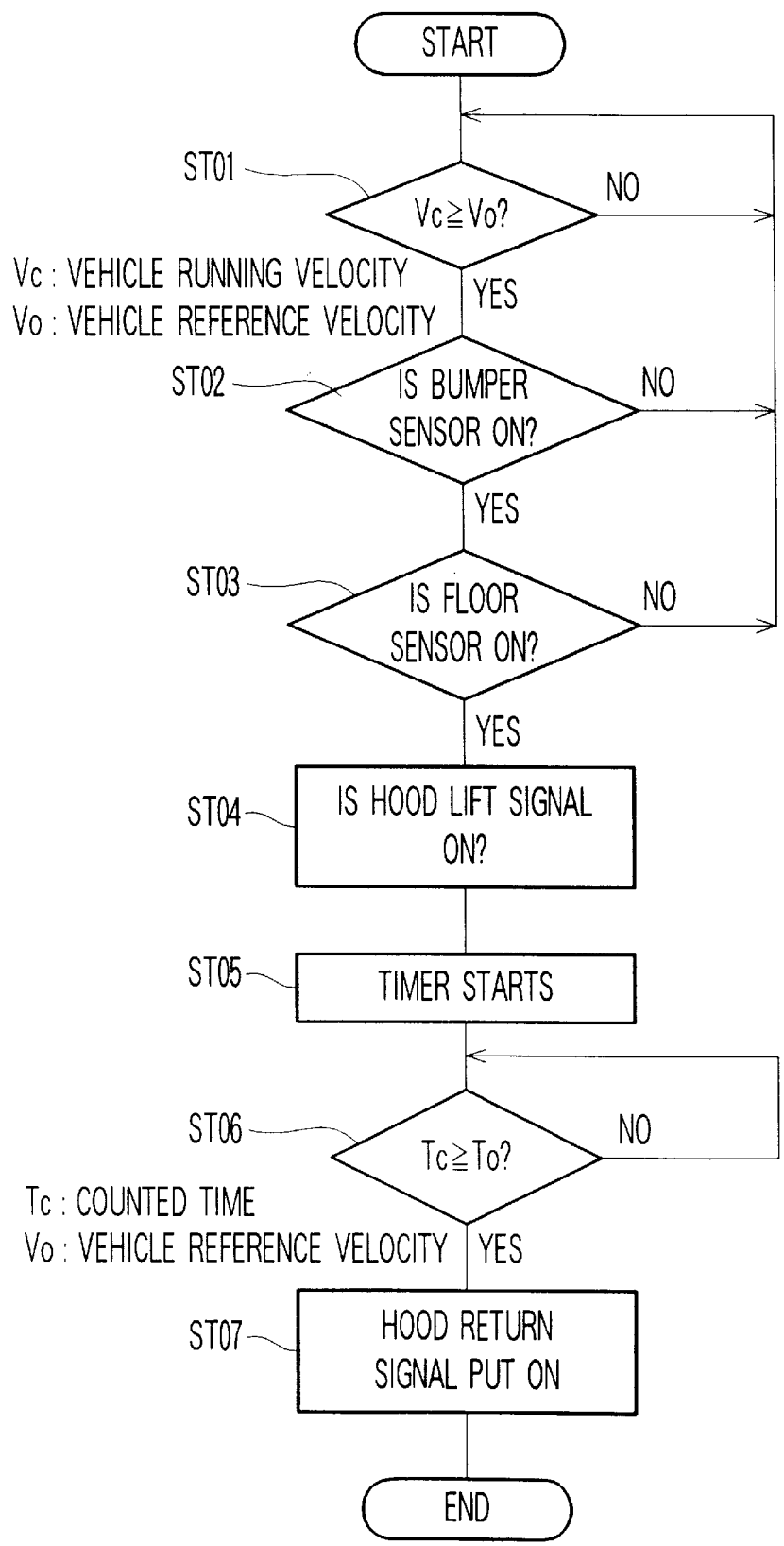
FIG. 4 is a flowchart showing the flow of control of a control unit of FIG. 3.

The reference time To used in ST 06 of FIG. 4, that is, the predetermined time from the time of lift of the hood 13 may be set optionally.

It may be possible to employ other stoppers for restricting the full-open angle 3 of the hood-retaining mechanism 20 than the lower link and upper link stoppers 23a, 25a. For example, the lower link stopper 23a may be on the bracket 21 of the vehicle such that it engages and disengages with respect to the lower link 23. Similarly, the upper link stopper 25 a may be provided on the lower link 23 such that it engages and disengages with respect to the upper link 25.

Figure 15:
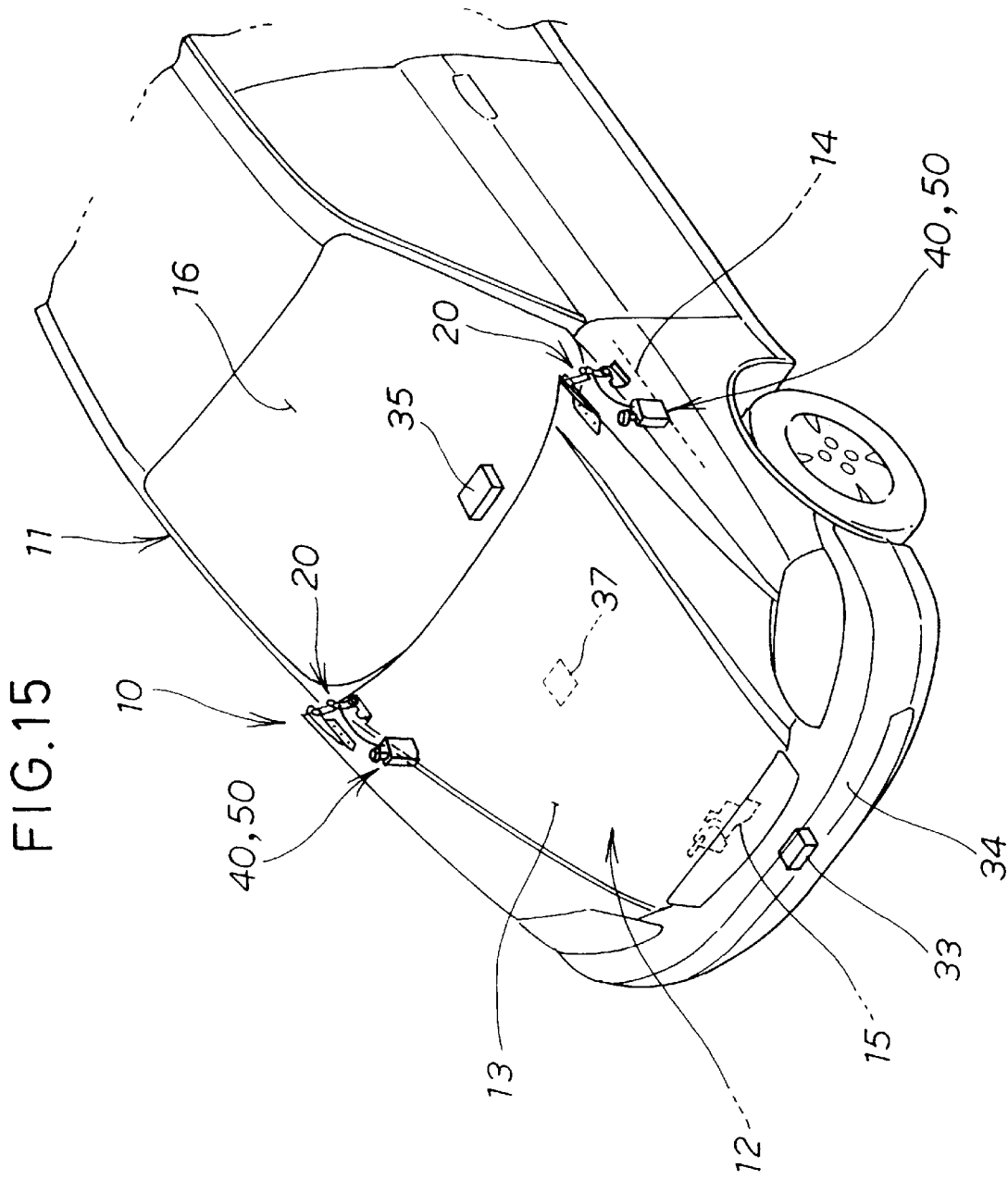
FIG. 15 is a schematic view illustrating part of a vehicle employing a vehicle hood apparatus according to a second embodiment of the present invention.
Figure 16:
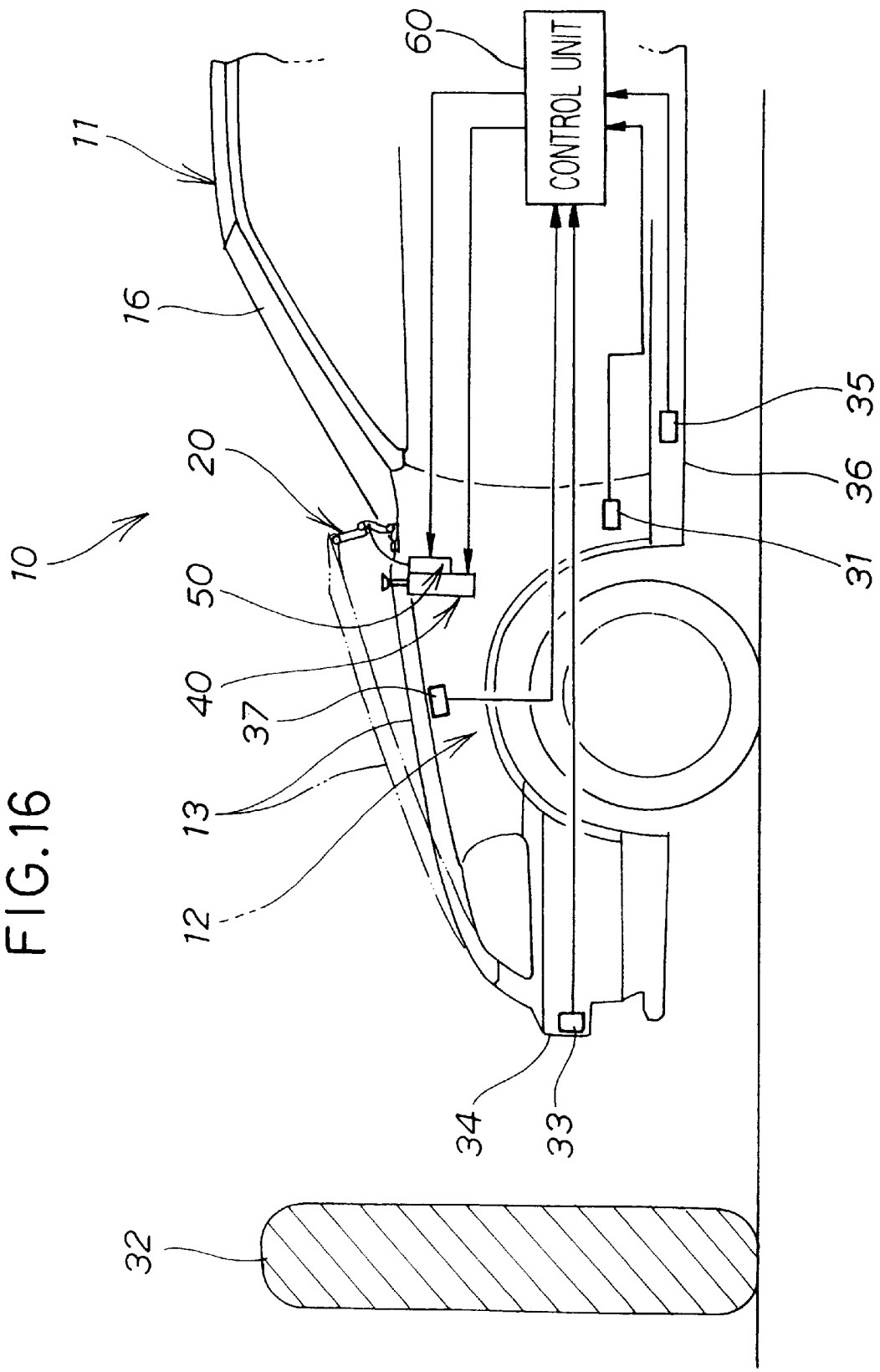
FIG. 16 is a side elevational view of the vehicle shown in FIG. 15.

Reference is made next as to FIGS. 15 and 16 illustrating the vehicle 11 employing a vehicle hood apparatus 10 according to a second embodiment of the present invention. Besides the various sensors shown in the first embodiment, the hood apparatus 10 of the second embodiment includes a hood collision detecting sensor 37 disposed on a reverse side of the hood 13 for outputting a signal representative of the collision of the obstacle against the hood 13. In the embodiment being described, the hood collision detecting sensor 37 comprises an acceleration sensor which outputs a collision signal when deceleration larger than a predetermined level is applied to an upper surface of the hood 13. For example, when an impact as large as to deform the hood 13 more than a predetermined amount is applied to the upper surface of the hood 13, the hood collision detecting sensor 37 detects deceleration corresponding to the impact and outputs a collision signal.

Based on the signals from the vehicle velocity sensor 31, bumper sensor 33, floor sensor 35 and hood collision detecting sensor 37, the control unit 60 controls the actions of the hood-lifting actuator 40 and the hood-returning actuator 50.

The arrangement and operation of the hood-retaining mechanism 20 are the same as those of the hood-retaining mechanism of the first embodiment.

Control of the control unit 60 of FIG. 16 will be discussed next with reference to PIG. 17.

Flow from ST 11 to ST 15 is the same as that of ST 01 to ST 05 of the flowchart of the first embodiment shown in FIG. 4 and its discussion will therefore be omitted.

In ST 16, determination is made as to whether the obstacle 32 collided with the hood 13 by detecting whether the hood collision detecting sensor 37 is ON. When a collision signal is fed from the collision detecting sensor 37, determination is made such that the obstacle 32 collided with the hood 13. Then, the hood-lifted state is maintained, thereby terminating the control. When no collision signal is outputted, it is determined that the obstacle did not collide with the hood 13, allowing the control to proceed to ST 17.

In ST 17, determination is made, in a state In which no collision signal it outputted from the hood collision detecting sensor 37, as to whether time Tc counted by a timer is longer than a reference time To (e.g., 0.1–0.5 sec.). When the counted time Tc falls within the range of the reference time To, the control returns to ST 16. When it falls out of the range of the reference time To, the control proceeds to ST 18.

In ST 18, the control unit 60 outputs a hood-return signal. Based on this signal, the hood-returning actuator 50 operates to cause the hood 13 to move down to its original position.

Similarly to ST 01 to ST 03 of the flowchart of FIG. 4 illustrative of the first embodiment, ST 11 to ST 13 perform collision determining functions for determining that the vehicle 11 collided with the obstacle 32. ST 14 performs a lift directing function for initiating the lifting action of the hood-lifting actuator 40. ST 15 and ST 17 function as a timer for timing a predetermined time after the hood 13 is lifted. ST 16 is a collision determining function for determining whether the obstacle 32 collided with the hood 13. ST 18 functions to initiate the action of the hood-returning actuator 50 to return the hood 13 to its original position.

As thus far explained, the control unit 60 has the built-in timer, hood-lifting control function for controlling the hood lifting action of the hood-lifting actuator 40, and hood-returning control function for controlling the hood returning action of the hood-returning actuator 50.

Thus, when the control unit 60 received a collision signal from the hood collision detecting sensor 37 after the hood 13 was lifted and when it did not receive such a collision signal but the time elapsed from the lift of the hood fell within the predetermined time, the control unit 60 effects the control such that the lifted state of the hood 13 is maintained. That is, the hood 13 remains lifted when the obstacle 32 collided with the hood 13 with a large impact that can be detected by the hood collision detecting sensor 37.

However, it often happens that after the hood 13 is lifted through the collision of the vehicle 11 with the obstacle 32, the predetermine time elapses with no collision of the obstacle 32 with the hood 13 being detected by the hood collision detecting sensor 37. In this instance, the control unit 60 effects the control so that the hood-returning actuator returns the hood to its original position. Namely, referring back to FIG. 14 illustrating the first embodiment, the control unit 60 feeds a hood-return signal to the hood-returning actuator 50. Then, the hood-returning actuator 50 starts its returning action to cause the returning wire 55 to pull at a high speed in the arrowed direction. The hood-retaining mechanism 20 is folded to cause the hood 13 to descend until it comes to its original position. Consequently, the state in which the driver's view obstructed by the lifted hood 13 is instantly cleared.

Figure 18:
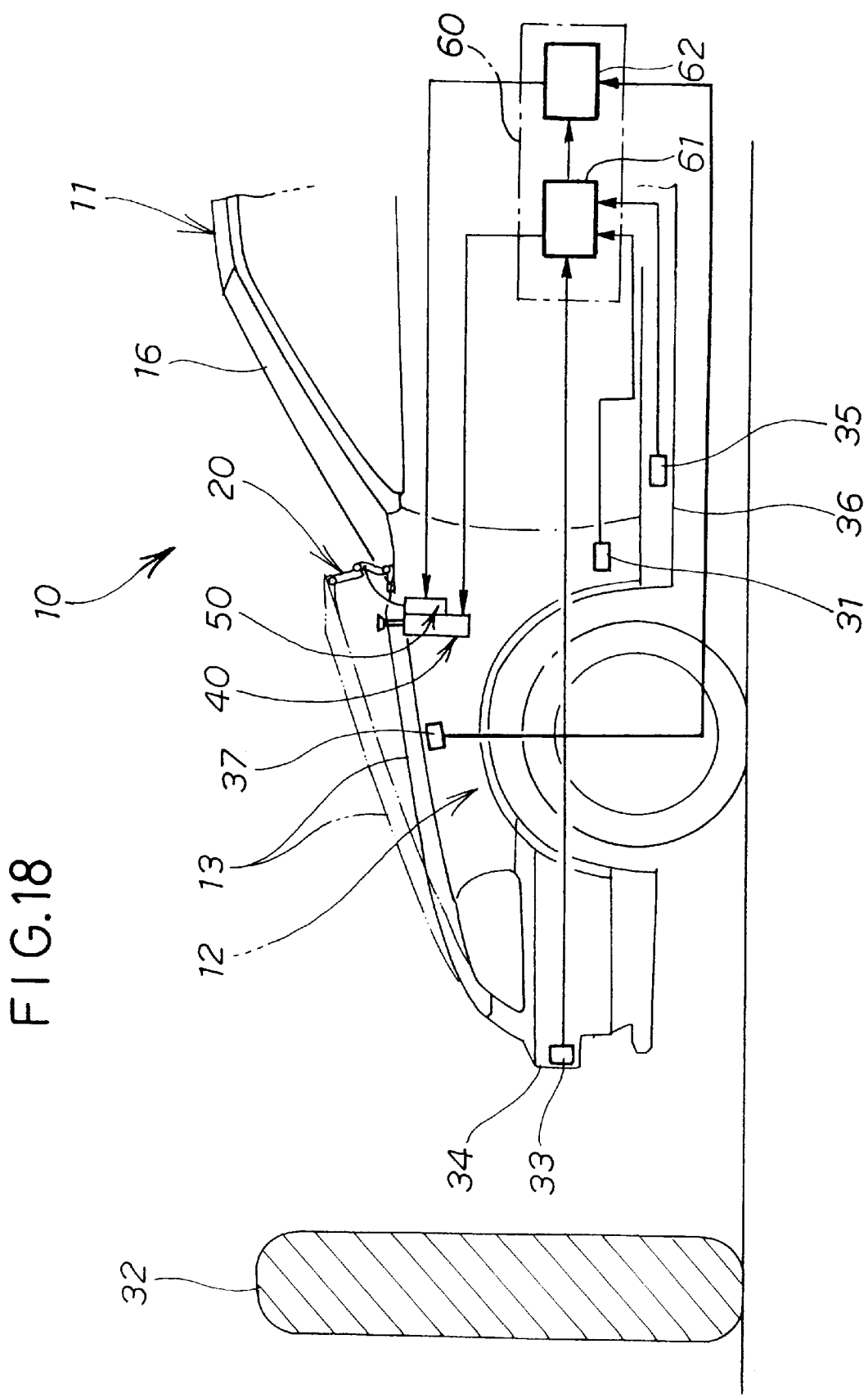
FIG. 18 is a side elevational view illustrating the vehicle with an exemplified form of the control unit of FIG. 16.

Illustrated in FIG. 18 is a specific example of the control unit 60 of FIG. 16. The control unit 60 includes a hood-lifting control section 61 for controlling the lifting action of the hood-lifting actuator 40 and a hood-returning control section 62 for controlling the returning action of the hood-returning actuator 50.

Figure 17:
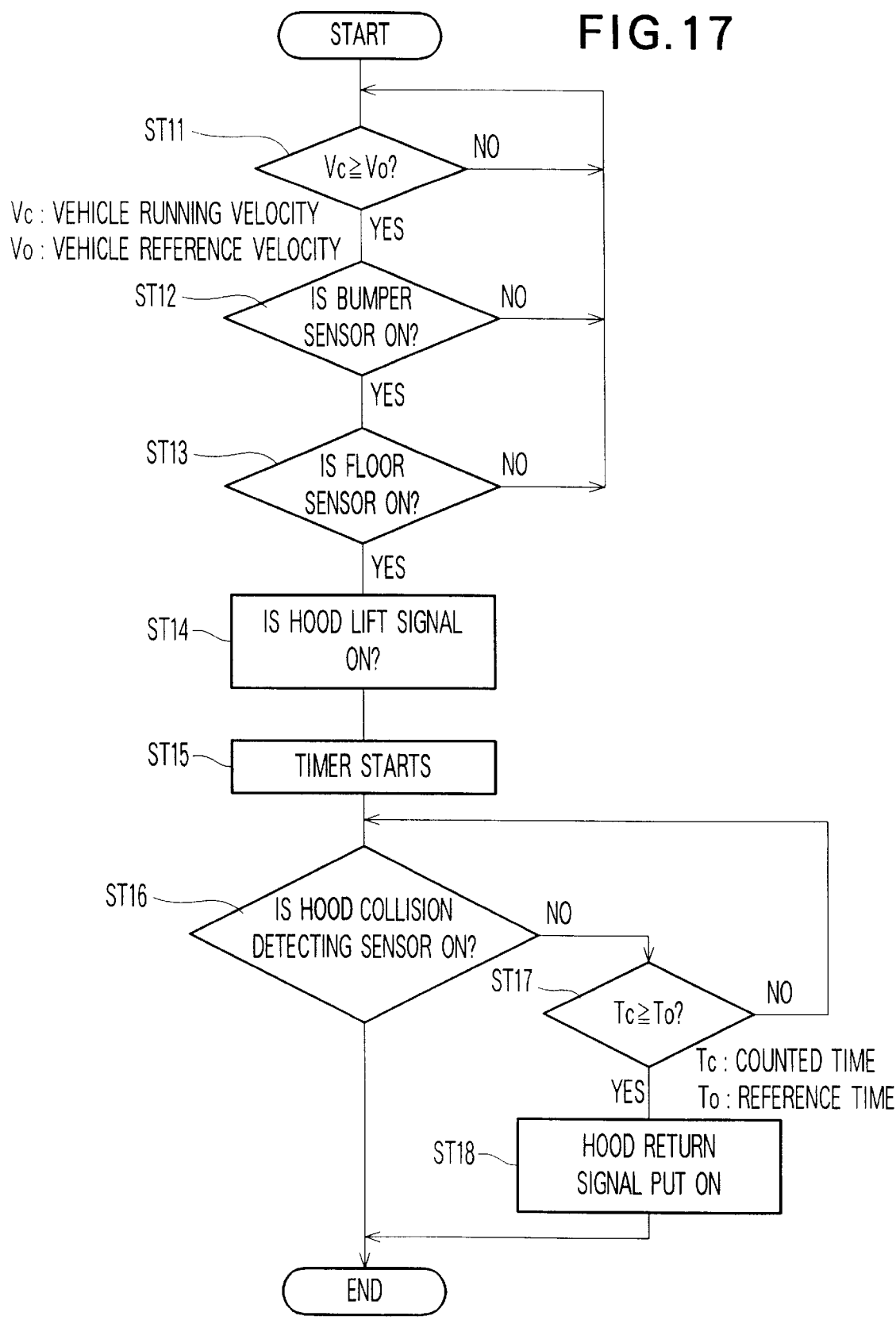
FIG. 17 is a flowchart illustrating a flow of control of a control unit shown in FIG. 16.

The hood-lifting control section 61 is provided to perform the operations of ST 11 to ST 14 of the flowchart of FIG. 17. After determining whether a hood-lifting signal is in existence, the hood-returning control section 62 performs the operations of ST 15 to ST 18 of the flowchart of FIG. 17.

Obviously, various minor changes and modifications of the present invention are possible in the light of the above teaching. It is therefore to be understood that within the scope of the appended claims the invention may be practiced otherwise than as specifically described.

What is claimed is:

1. A vehicle hood apparatus for, when a vehicle collides with an obstacle, lifting a hood at a frontal part of the vehicle a predetermined amount and retaining the hood at a lifted position, said hood apparatus comprising:

a timer for timing a predetermined time elapsed from the lift of said hood; and a hood-returning actuator for, when the predetermined time has elapsed, returning, based on a signal outputted from said timer, said hood to a position where said hood was before said hood was lifted.

2. A vehicle hood apparatus for, when a vehicle collides with an obstacle, lifting a hood at a frontal part of the vehicle a predetermined amount and retaining the hood at a lifted position, said hood apparatus comprising:

a hood collision detecting sensor for, when the obstacle collides with said hood, outputting a collision signal corresponding to the detected collision;

a hood-returning actuator being operable to return said lifted hood to an original position thereof; and a hood-returning control section for, when fed with said collision signal after said hood is lifted and when fed with no collision signal but the time elapsed from the lift of said hood falls within said predetermined time, controlling said hood-returning actuator such that said actuator retains said hood at its lifted position, and for, when said predetermined time elapsed from the lift of said hood without being fed with said collision signal, controlling said hood-returning actuator such that said actuator returns said hood to its original position.

* * * * *